(12) United States Patent
Zheng

(10) Patent No.: US 12,025,252 B2
(45) Date of Patent: Jul. 2, 2024

(54) SYSTEM FOR A SELF-RECOILING HOSE

(71) Applicant: Aiqi Zheng, Zhongshan (CN)

(72) Inventor: Aiqi Zheng, Zhongshan (CN)

( * ) Notice: Subject to any disclaimer, the term of this patent is extended or adjusted under 35 U.S.C. 154(b) by 213 days.

(21) Appl. No.: 17/535,481

(22) Filed: Nov. 24, 2021

(65) Prior Publication Data

US 2022/0082193 A1 Mar. 17, 2022

Related U.S. Application Data

(63) Continuation-in-part of application No. 16/869,587, filed on May 7, 2020, now Pat. No. 11,326,725.

(60) Provisional application No. 62/860,168, filed on Jun. 11, 2019, provisional application No. 62/844,612, filed on May 7, 2019.

(51) Int. Cl.
*F16L 33/01* (2006.01)
*F16L 11/02* (2006.01)
*F16L 11/04* (2006.01)
*F16L 33/22* (2006.01)

(52) U.S. Cl.
CPC ............ *F16L 33/01* (2013.01); *F16L 11/02* (2013.01); *F16L 11/04* (2013.01); *F16L 33/223* (2013.01)

(58) Field of Classification Search
CPC ....... F16L 33/20; F16L 33/223; F16L 33/224; F16L 33/226; F16L 33/081; F16L 11/085; F16L 11/02

USPC .......................................................... 285/245
See application file for complete search history.

(56) References Cited

U.S. PATENT DOCUMENTS

| 2008/0251152 A1* | 10/2008 | Masarwa | F16L 11/02 |
| 2014/0203549 A1* | 7/2014 | Stednitz | F16L 11/085 |
| 2016/0245430 A1* | 8/2016 | Mezzalira | F16L 11/085 |
| 2019/0226615 A1 | 7/2019 | Wu | |
| 2019/0242502 A1 | 8/2019 | Pan | |
| 2021/0062939 A1* | 3/2021 | Zhang | F16L 11/085 |

FOREIGN PATENT DOCUMENTS

| CN | 202442051 U | * | 9/2012 | ............. F16L 11/12 |
| CN | 205371860 U | * | 7/2016 | |

OTHER PUBLICATIONS

Machine Translation of CN-202442051-U (Year: 2012).*

* cited by examiner

*Primary Examiner* — Zachary T Dragicevich

(57) ABSTRACT

A self-recoiling hose system provides an expandible-length hose that automatically condenses to a smaller size upon completion of usage. The system includes an inner elastic tube, a protective sheath, a fluid inlet, and a fluid outlet. The inner elastic tube is an inert, flexible, elongated hollow member capable of transporting fluids, especially water, from a source to a desired location. The protective sheath is a hollow elongated member which sleeves and prevents the inner elastic tube from being directly contacted. The fluid inlet allows fluids to enter the inner elastic tube, while the fluid outlet allows fluids to exit the inner elastic tube.

12 Claims, 11 Drawing Sheets

SYSTEM FOR A SELF-RECOILING HOSE

The current application is a continuation-in-part (CIP) application of a U.S. non-provisional application Ser. No. 16/869,587 filed on May 7, 2020. The U.S. non-provisional application Ser. No. 16/869,587 claims a priority to a U.S. provisional application Ser. No. 62/844,612 filed on May 7, 2019, and a priority to a U.S. provisional application Ser. No. 62/860,168 filed on Jun. 11, 2019.

FIELD OF THE INVENTION

The present invention generally relates to tools and hardware for managing fluids. More specifically, the self-recoiling hose system relates to hardware which facilitates the connection of spouts, nozzles, or other fluid manipulation tools to a fluid source as well as the subsequent transfer of fluids to a desired location.

BACKGROUND OF THE INVENTION

Expandable hoses have become more popular choices over traditional hoses due to their relatively greater flexibility, durability, and fatigue resistance. Expandable hoses are also often easier to operate and store due to their expanding capabilities, which reduce their overall size and unwieldiness for storage and transportation purposes while enabling expansion for operation. Many expandable hoses utilize an inner tube to provide the primary water-transportation means and an outer sleeve to serve as protection against damage from external sources during use. In addition, there are various accessories for expandable hoses which improve their functionality and capabilities such as connectors or nozzles.

However, many expandable hoses fail to adequately protect the inner tube from various potential hazards, such as inclement weather or poor or excessive usage. Many tools do not account for strains beyond an expected range, thus disregarding mechanisms for failure due to excessive elongation or compression of either the inner tube or the outer sheath. Additionally, there are few accessories designed for multi-channel expandable hoses which prevent leakage while allowing for multiple accessories to be connected to the expandable hose. What is needed is a device that improves use of such hoses and accessories by improving their connection mechanism, optimizing for intuition and fluid transfer quality.

The present invention addresses this issue. The self-recoiling hose system provides an expandible-length hose that automatically condenses to a smaller size upon completion of usage. A set of elastic fibers is interwoven with a set of rigid fibers, thus allowing the expandable hose to elongate to a maximum length that is within a reasonable predetermined length. This prevents the inner tube from expanding beyond its intended length. The present invention further provides a connection mechanism for expandable hoses. The present invention is designed to prevent any possible leakage between one or more expandable hoses and the present invention. A threaded connector enables attachment of the expandable hose to other hoses. Another unit fits inside the inner channel of an expandable hose, while a third part surrounds the inner channel of the expandable hose. An annular fastener secures the outer channel of the expandable hose to the inner channel. Altogether, the present invention enables a user to securely attach an expandable hose to a spout, faucet, spicket, another hose, or a variety of other devices and tools.

DETAILED DESCRIPTION OF THE INVENTION

All illustrations of the drawings are for the purpose of describing selected versions of the present invention and are not intended to limit the scope of the present invention.

Figure 1:
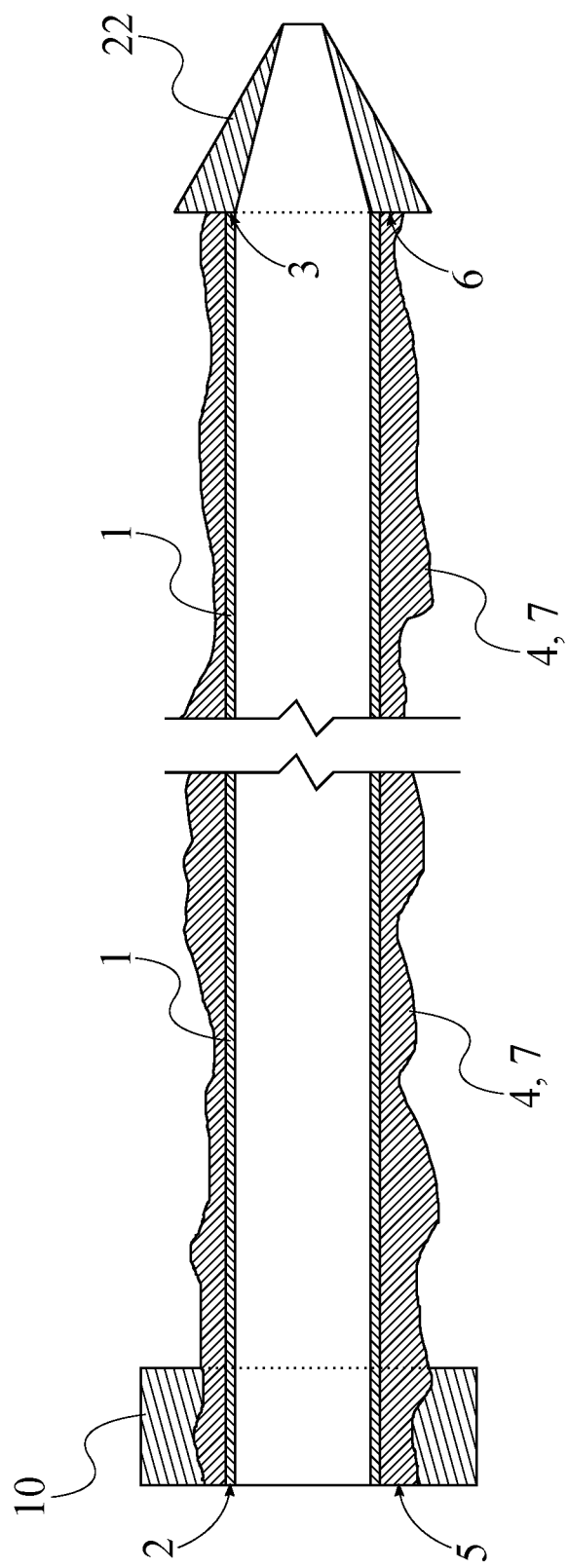
FIG. 1 is a schematic diagram representing a front view of the present invention.

The present invention is a self-recoiling hose system that is used to expand while transporting fluids, especially pressurized water. The present invention is also configured to automatically retract upon completion of fluid transportation. The present invention comprises an inner elastic tube 1, a protective sheath 4, a fluid inlet 10, and a fluid outlet 22, as represented in FIG. 1. The inner elastic tube 1 is an inert, generally flexible, elongated hollow member capable of transporting fluids, especially water, from a source to a desired location. The protective sheath 4 is a similar hollow elongated member which prevents the inner elastic tube 1 from being contacted directly, thus preventing potential mechanical damage. The fluid inlet 10 denotes the portion of the present invention through which fluids may enter the inner elastic tube 1 during the preferred usage of the present invention. Conversely, the fluid outlet 22 denotes the portion of the present invention through which fluids may exit the inner elastic tube 1 during the preferred usage of the present invention.

Figure 2:
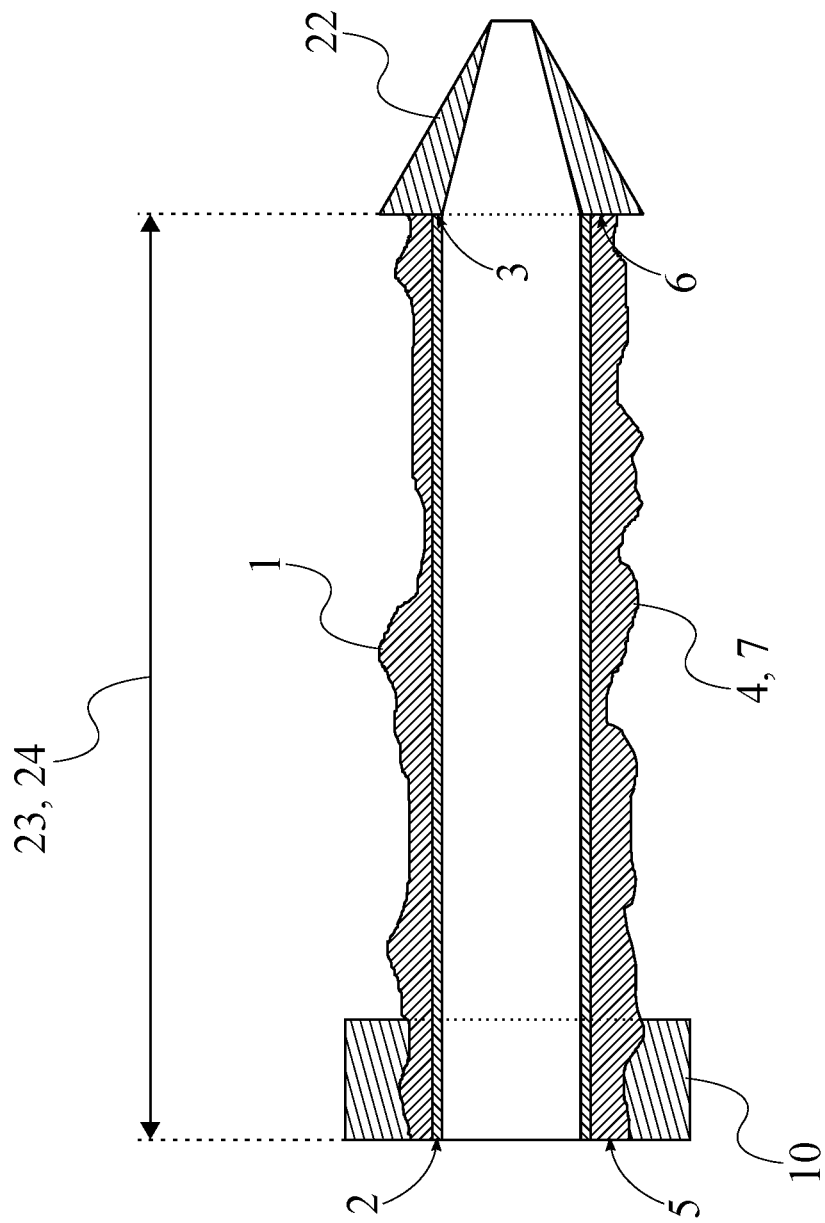
FIG. 2 is a schematic diagram representing a front view of the present invention in an equilibrium state.

The general configuration of the aforementioned components allows the present invention to efficiently and effectively transport fluids from a source to a desired location. The inner elastic tube 1 comprises a first tube end 2 and a second tube end 3, as represented in FIG. 1. The first tube end 2 is an opening in the inner elastic tube 1 through which fluid may pass. The second tube end 3 is an opening in the inner elastic tube 1 opposite the first tube end 2 through which fluid may pass. The protective sheath 4 comprises a first sheath end 5 and a second sheath end 6. The first sheath end 5 is an opening which joins to the first tube end 2. Similarly, the second sheath end 6 is an opening which joins to the second tube end 3. The inner elastic tube 1 may be sleeved by the protective sheath 4. Thus, the protective sheath 4 fully covers the inner elastic tube 1. The first sheath end 5 may be hermetically connected to the first tube end 2. In this way, fluid may not escape and situate between the inner elastic tube 1 and the protective sheath 4 from the first tube end 2. Furthermore, the fluid inlet 10 may be hermetically attached into the first tube end 2. This arrangement allows fluid to flow through the fluid inlet 10 into the inner elastic tube 1 without affecting the protective sheath 4. Similarly, the second sheath end 6 may be hermetically connected to the second tube end 3. In this way, fluid may not escape and situate between the inner elastic tube 1 and the protective sheath 4 from the second tube end 3. Furthermore, the fluid outlet 22 may be hermetically attached into the second tube end 3. This arrangement allows fluid to flow through the fluid outlet 22 out of the inner elastic tube 1 without affecting the protective sheath 4. A sheath equilibrium length 23 of the protective sheath 4 may be greater than a tube equilibrium length 24 of the inner elastic tube 1. The sheath equilibrium length 23 and the tube equilibrium length 24 relate to the lengths of the protective sheath 4 and the inner elastic tube 1, respectively, when they are unaffected by external elongating or compressive forces, as represented in FIG. 2. In this way, the protective sheath 4 may have excessive material available to expand before testing the properties of the threads that comprise the protective sheath 4.

Figure 4:
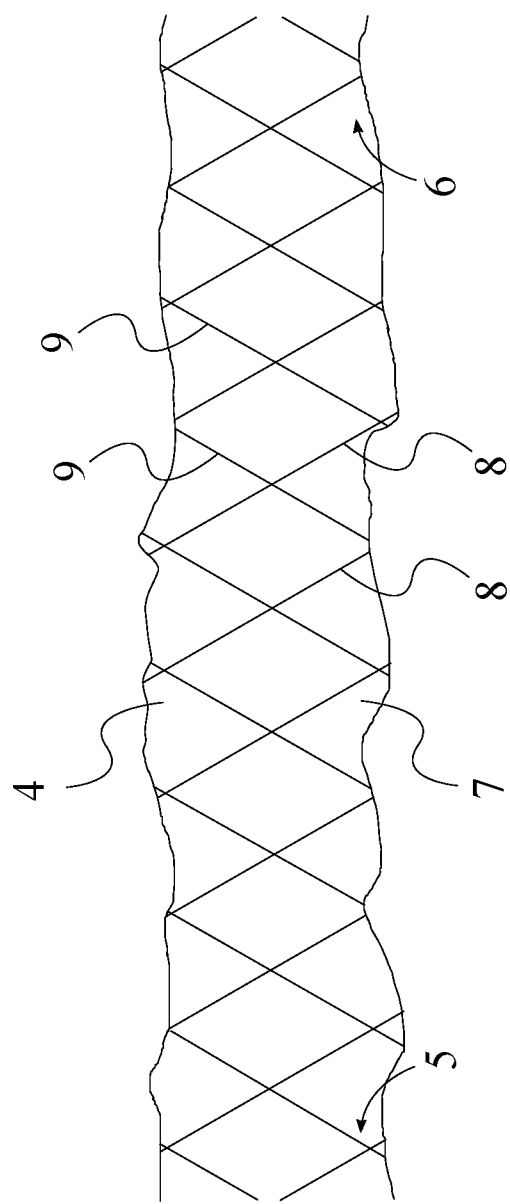
FIG. 4 is a schematic diagram representing a front view of the threads of the sheath of the present invention.

The protective sheath 4 must be capable of bending and stretching to a predefined limit in order to prevent overstretching of the inner elastic tube 1. To this end, the protective sheath 4 may further comprise a fabric body 7. The fabric body 7 is the volume occupied by the material of the protective sheath 4. The fabric body 7 may comprise a plurality of elastic strands 8 and a plurality of tensile strands 9, as represented in FIG. 4. The plurality of elastic strands 8 is a set of flexible, elongating threads that may impart elastic properties to a material in which the plurality of elastic strands 8 is interwoven. The plurality of tensile strands 9 is a set of flexible threads that cannot expand, thus, in the preferred usage of the present invention, preventing overexertion of both the plurality of elastic strands 8 and the inner elastic tube 1. The plurality of elastic strands 8 may be interwoven amongst the plurality of tensile strands 9. This arrangement enables the fabric body 7 to stretch to expand, in accordance with the plurality of elastic strands 8, but only up to a certain predetermined length, in accordance with the plurality of tensile strands 9.

The inner elastic tube 1 will often be stored in a resting state, with no compressive or tensile forces being applied to the inner elastic tube 1 or to the protective sheath 4. Specifically, the inner elastic tube 1 and the protective sheath 4 may be arranged into a resting configuration, as represented in FIG. 2. The resting configuration relates to the inner elastic tube 1 and the protective sheath 4 when no forces are applied. The protective sheath 4 may be ruched along the inner elastic tube 1. This offers the inner elastic tube 1 a greater amount of protection from potential physical damage during storage and further provides excess material to be elongated during usage of the present invention.

Figure 3:
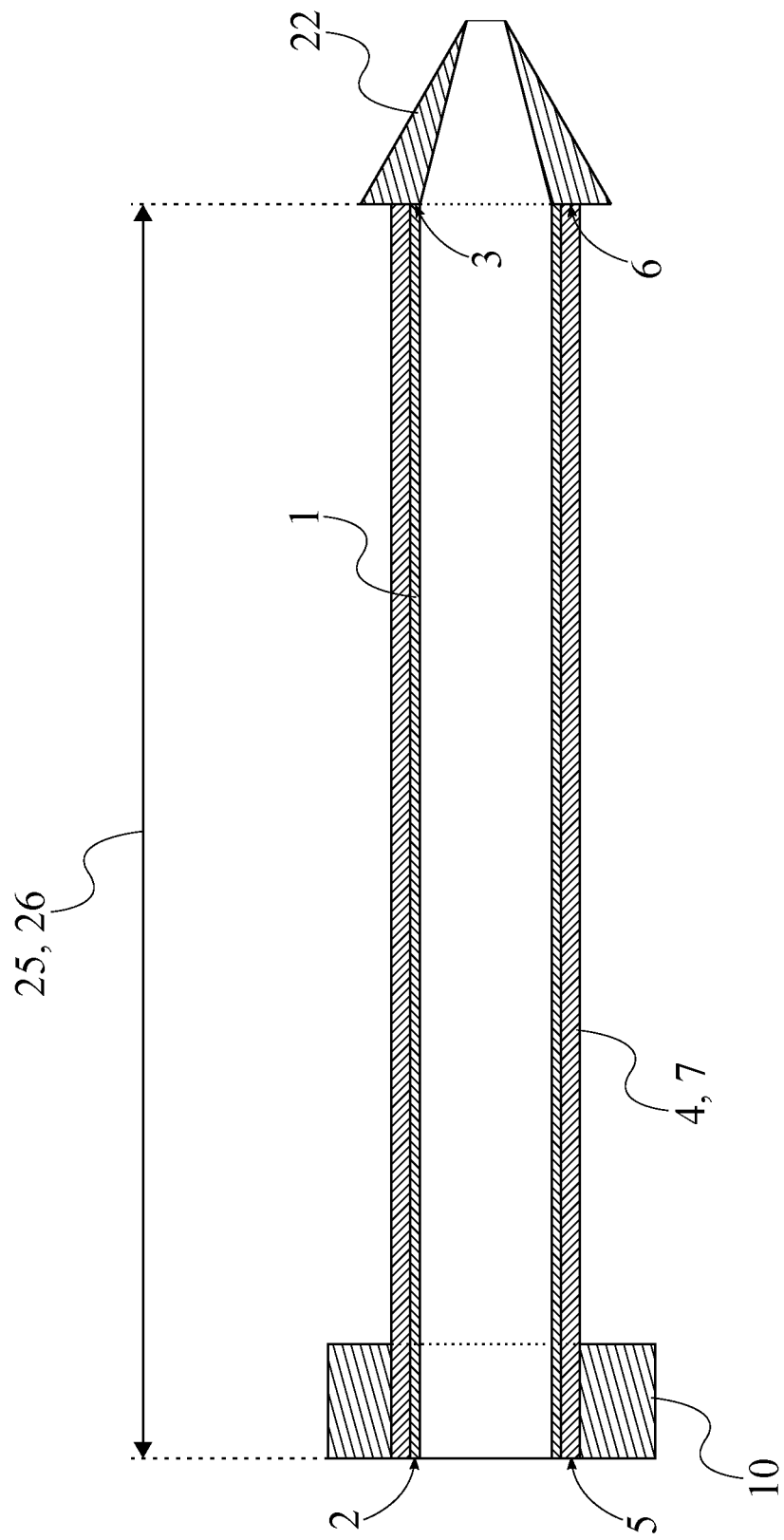
FIG. 3 is a schematic diagram representing a front view of the present invention in a stretched state.

The present invention must be capable of extending to a desired length during use. To allow for this, the inner elastic tube 1 and the protective sheath 4 may be arranged into an extended configuration. The extended configuration is the configuration in which the fluid inlet 10 is generally furthest from the fluid outlet 22. A sheath stretched length 25 of the protective sheath 4 may be equal to a tube stretched length 26 of the inner elastic tube 1, as represented in FIG. 3. In this way, the protective sheath 4 may continue to prevent potential external stimuli from damaging or affecting the inner elastic tube 1. In an exemplary embodiment, the plurality of tensile strands 9 may further be stretched to maximum length in the extended configuration, thus preventing potential damage due to overstretching of the inner elastic tube 1.

The inner elastic tube 1 must be capable of both compressing to a substantially smaller size for storage purposes as well as extending to a much longer size for use in transporting fluids. To this end, the inner elastic tube 1 may be made of a semirigid polymeric material. This arrangement ensures that the inner elastic tube 1 can both elongate and compress as desired while transporting fluids or during storage.

Figure 5:
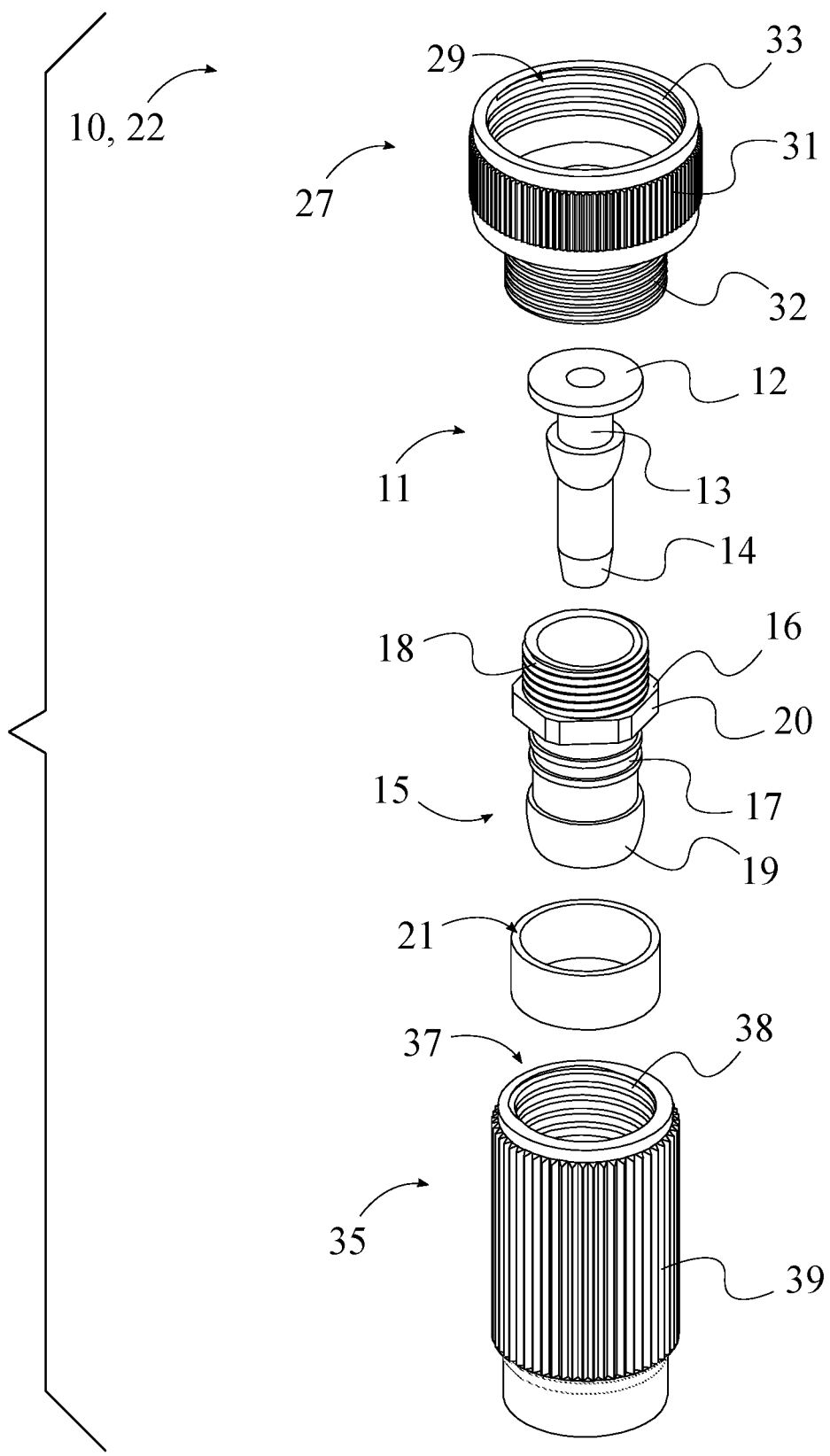
FIG. 5 is a top perspective view of the present invention.
Figure 6:
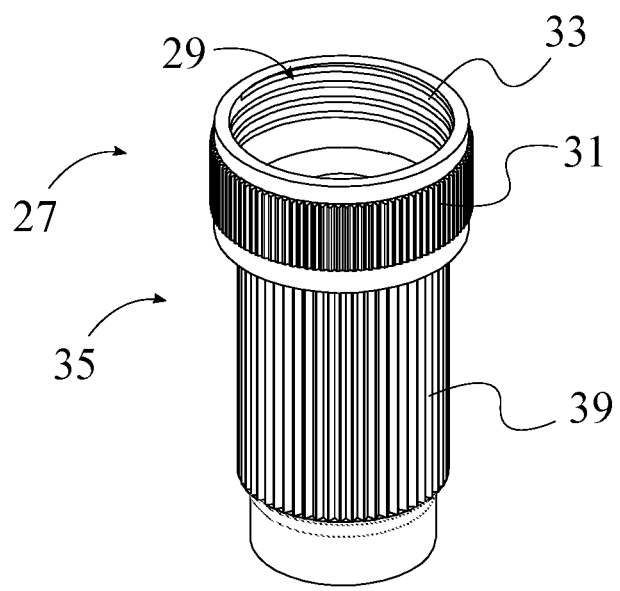
FIG. 6 is a top perspective view of the present invention.

The present invention further includes a mechanism for connecting to the first tube end 2 and the second tube end 3 for subsequent distribution of fluids. To this end, the fluid inlet 10 and the fluid outlet 22 may each comprise a tubular insert 11, a tubular brace 15, and an annular crimp 21, as shown in FIGS. 5 and 6. The tubular insert 11 is an elongated device that comes into direct contact with the fluid moving through the inner elastic tube 1. The tubular brace 15 relates to a connector that enables appropriate arrangement of the inner elastic tube 1 relative to the tubular insert 11 and the annular crimp 21. The annular crimp 21 is a ring-shaped fastener that, in the preferred usage of the present invention, secures the inner elastic tube 1 in place against the tubular brace 15. The tubular insert 11 may comprise an insert flange 12, an insert annular groove 13, and an insert wedging feature 14. The insert flange 12 relates to a generally flat disk-shaped unit which prevents the tubular insert 11 from sliding into the tubular brace 15 during use. The insert annular groove 13 is preferably a recessed space of the tubular insert 11 which enhances the ability of the insert flange 12 to retain the inner elastic tube 1 through friction against the generally smooth inside surface of the inner elastic tube 1. The insert wedging feature 14 relates to a hollow fixture that facilitates insertion of the tubular insert 11 into the inner elastic tube 1. Moreover, the tubular brace 15 comprises a brace flange 16, a brace annular groove 17, a brace male-threading feature 18, and a brace wedging feature 19. The brace flange 16 relates to an edge of the tubular brace 15 that enables appropriate arrangement of the tubular insert 11 relative to the tubular brace 15. The brace annular groove 17 is preferably a recessed space of the tubular brace 15 that enhances the ability of the tubular brace 15 to retain the protective sheath 4 through friction against the generally smooth inside surface of the inner elastic tube 1. The brace male-threading feature 18 is a helical protrusion that enables connection to a standardized inversely-threaded helical channel on a variety of other fluid transportation devices. The brace wedging feature 19 relates to a hollow fixture that, in the preferred usage of the present invention, facilitates insertion of the tubular brace 15 into the protective sheath 4 while allowing the inner elastic tube 1 to pass through the tubular brace 15.

In order to allow the present invention to enable flow into and out of the inner elastic tube 1, the components are configured to appropriately interact with each other. The insert flange 12 and the insert wedging feature 14 may be positioned opposite to each other along the tubular insert 11, as shown in FIGS. 5 and 6. This arrangement allows for appropriate alignment of the inner elastic tube 1 about the tubular insert 11. The insert annular groove 13 may be laterally positioned around the tubular insert 11, adjacent to the insert flange 12. Thus, the insert annular groove 13 is positioned to provide a friction fit for the inner elastic tube 1, and the insert flange 12 is positioned to prevent the tubular insert 11 from traversing too far into the inner elastic tube 1 during use. The brace male-threading feature 18 and the brace wedging feature 19 may be positioned opposite to each other along the tubular brace 15. In this way, the brace male-threading feature 18 does not functionally interfere with the brace wedging feature 19. The brace flange 16 may be laterally positioned around the tubular brace 15, adjacent to the brace male-threading feature 18. This arrangement enables the brace male-threading feature 18 to connect to a female threaded object up to the brace flange 16. The brace annular groove 17 may be laterally positioned around the tubular brace 15. In this way, the brace annular groove 17 may assist with the retention of the protective sheath 4. The brace annular groove 17 may be positioned adjacent to the brace flange 16, opposite the brace male-threading feature 18. This arrangement makes application of the present invention more intuitive as the inner elastic tube 1 optimally connects to the brace annular groove 17. The insert annular groove 13 and the insert wedging feature 14 may be positioned inside the tubular brace 15. In this way, the tubular insert 11 extends within the tubular brace 15 to provide a connection mechanism for the inner elastic tube 1. This allows the tubular insert 11 to be placed within the inner elastic tube 1 so that the inner elastic tube 1 is pressed in between the tubular insert 11 and the tubular brace 15. The insert flange 12 may be positioned outside the tubular brace 15. In this way, the insert flange 12 prevents the tubular insert 11 from extending too far into the tubular brace 15. The insert flange 12 may be pressed against the brace male-threading feature 18. Thus, the insert flange 12 ensures a snug fit of the tubular insert 11 within the tubular brace 15. The annular crimp 21 may be mounted around the brace annular groove 17. This arrangement enables the annular crimp 21 to secure the protective sheath 4 against the tubular brace 15, especially adjacent to the brace annular groove 17. The insert wedging feature 14 of the fluid inlet 10 may be hermetically attached into the first tube end 2. In this way, water or other fluids may not escape while entering the first tube end 2. Similarly, the insert wedging feature 14 of the fluid outlet 22 may be hermetically attached into the second tube end 3. Thus, water or other fluids may not escape laterally or undesirably while passing through the second tube end 3.

Figure 10:
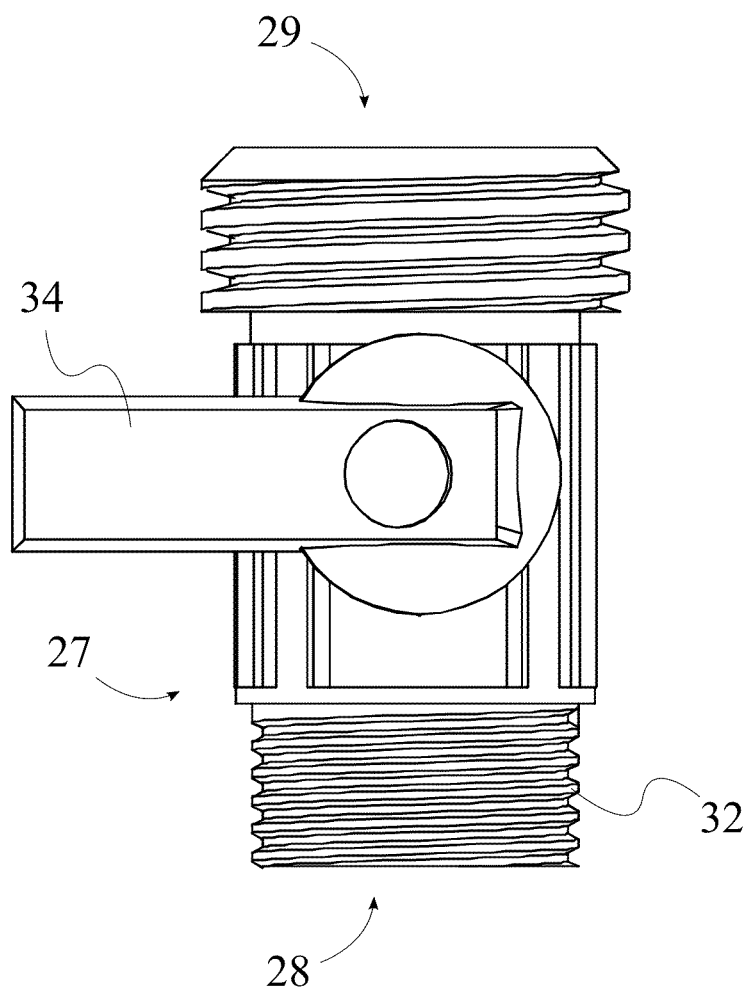
FIG. 10 is a front view of an interchangeable hose connector of the present invention.

The present invention may require connection to a spout or water source that allows for pressure and flow adjustment. To enable such a connection, the present invention may further comprise at least one interchangeable hose connector 27, as shown in FIG. 10. The at least one interchangeable hose connector 27 relates to a mechanism by which the tubular insert 11 and the tubular brace 15 may connect to a water source or supply or may connect to a variety of other devices. The at least one interchangeable hose connector 27 may comprise a connector inlet 28, a connector outlet 29, and a first connector female-threading feature 30. The connector inlet 28 relates to an opening through which fluid may enter/exit the at least one interchangeable hose connector 27. The connector outlet 29 is an opening through which fluid may enter/exit the at least one interchangeable hose connector 27. The first connector female-threading feature 30 relates to a helical channel by which the at least one interchangeable hose connector 27 may connect to a male-threaded device of similar helical dimensions. The connector inlet 28 may be in fluid communication with the connector outlet 29. Thus, fluid may flow through the at least one interchangeable hose connector 27. The connector inlet 28 and the connector outlet 29 may be positioned opposite to each other about the at least one interchangeable hose connector 27. This arrangement allows the at least one interchangeable hose connector 27 to transfer fluids to and from the tubular insert 11 and the tubular brace 15. The first connector female-threading feature 30 may be positioned within the connector inlet 28. This arrangement enables the connector inlet 28 to securely fasten to a male-threaded object without loss of fluid. The first connector female-threading feature 30 may be integrated into the connector inlet 28. Thus, the first connector female-threading feature 30 provides a secure fastening mechanism for the tubular brace 15.

The first connector female-threading feature 30 requires the application of torque to join the at least one interchangeable hose connector 27 to external tools or devices. To this end, the at least one interchangeable hose connector 27 may further comprise a plurality of connector gripping ridges 31, as shown in FIG. 10. The plurality of connector gripping ridges 31 relates to a set of preferably linear protrusions which provide increased surface area, thereby enhancing the ability of the user to grip the at least one interchangeable hose connector 27 for the subsequent application of appropriate torque. The plurality of connector gripping ridges 31 may be laterally connected to the connector outlet 29. This arrangement provides the user with adequate access to the plurality of connector gripping ridges 31. The plurality of connector gripping ridges 31 may be distributed about the connector outlet 29. In this way, the plurality of connector gripping ridges 31 provides equal advantage to the user for applying torque regardless of where the user grips the plurality of connector gripping ridges 31.

In some embodiments, the at least one interchangeable hose connector 27 may need to connect to protective components that prevent damage to the present invention. To achieve this, the at least one interchangeable hose connector 27 may further comprise a connector male-threading feature 32, as shown in FIG. 10. The connector male-threading feature 32 relates to a helical protrusion that enables connection to a correspondingly-sized female-threading feature on a variety of housing components or other components with a male-threading feature. The connector male-threading feature 32 may be laterally connected about the connector inlet 28. This arrangement ensures that the connector male-threading feature 32 is accessible to various devices with female-threaded features.

The user may desire to attach the at least one interchangeable hose connector 27 to a device with female threading. To this end, at least one interchangeable hose connector 27 may further comprise a second connector female-threading feature 33, as shown in FIG. 10. The second connector female-threading feature 33 relates to a helical channel by which the at least one interchangeable hose connector 27 may connect to a male-threaded device of similar helical dimensions. The second connector female-threading feature 33 is positioned within the connector outlet 29. Thus, the second connector female-threading feature 33 enables connection of the at least one interchangeable hose connector 27 to a variety of housing components or other components with male-threading features. The second connector female-threading feature 33 is integrated into the connector outlet 29. This arrangement prevents fluid losses during fluid transfer.

Figure 9:
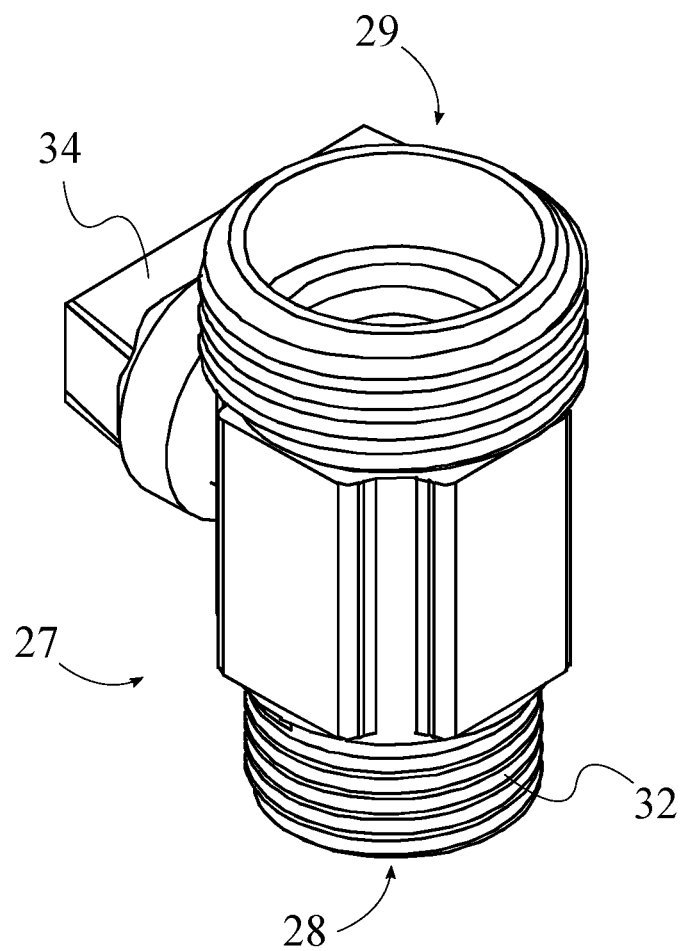
FIG. 9 is a top perspective view of an interchangeable hose connector of the present invention.

It may be further desirable to enable the at least one interchangeable hose connector 27 to moderate the flow into the present invention. To achieve this goal, the at least one interchangeable hose connector 27 may further comprise a connector valve 34, as shown in FIG. 9. The connector valve 34 preferably relates to a ball valve but may relate to any of a variety of fluid-flow-controlling valves. The connector valve 34 may be positioned in between the connector inlet 28 and the connector outlet 29. This arrangement allows the connector valve 34 to contact the fluid flowing between the connector inlet 28 and the connector outlet 29. The connector inlet 28 may be in fluid communication with the connector outlet 29 through the connector valve 34. Thus, the connector valve 34 controls fluid flow through the at least one interchangeable hose connector 27.

Figure 7:
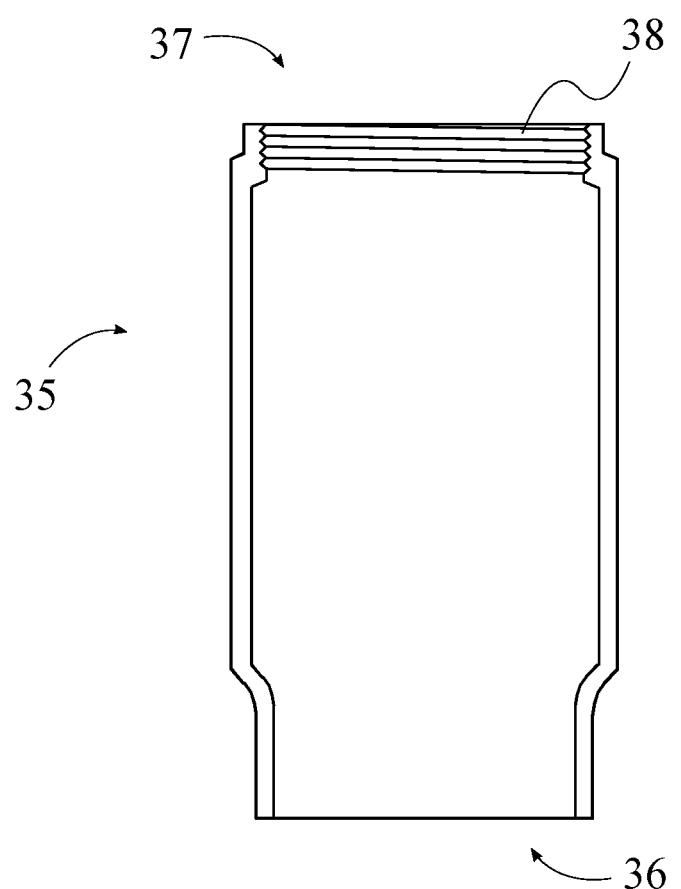
FIG. 7 is a schematic view representing the rigid sleeve of the present invention.

The present invention benefits from the inclusion of protective components. To provide for this need, the present invention may further comprise a rigid sleeve 35, as shown in FIG. 7. The rigid sleeve 35 relates to a preferably metal housing that shelters the present invention and the inner elastic tube 1 from potential damage due to a variety of external factors. The rigid sleeve 35 may comprise a first open end 36 and a second open end 37. The first open end 36 and the second open end 37 allow the inner elastic tube 1 to traverse through the rigid sleeve 35. The rigid sleeve 35 may be mounted around the tubular insert 11, the tubular brace 15, and the annular crimp 21. This arrangement allows the rigid sleeve 35 to protect the tubular insert 11, the tubular brace 15, and the annular crimp 21 as well as the inner elastic tube 1. The tubular insert 11, the tubular brace 15, and the annular crimp 21 may be positioned offset from the first open end 36 so that the rigid sleeve 35 is able to extend along and protect an attached end of the inner elastic tube 1 and the protective sheath 4. The tubular insert 11, the tubular brace 15, and the annular crimp 21 may be positioned adjacent to the second open end 37. Thus, the second open end 37 enables attachment of the rigid sleeve 35 to the inner elastic tube 1.

Figure 8:
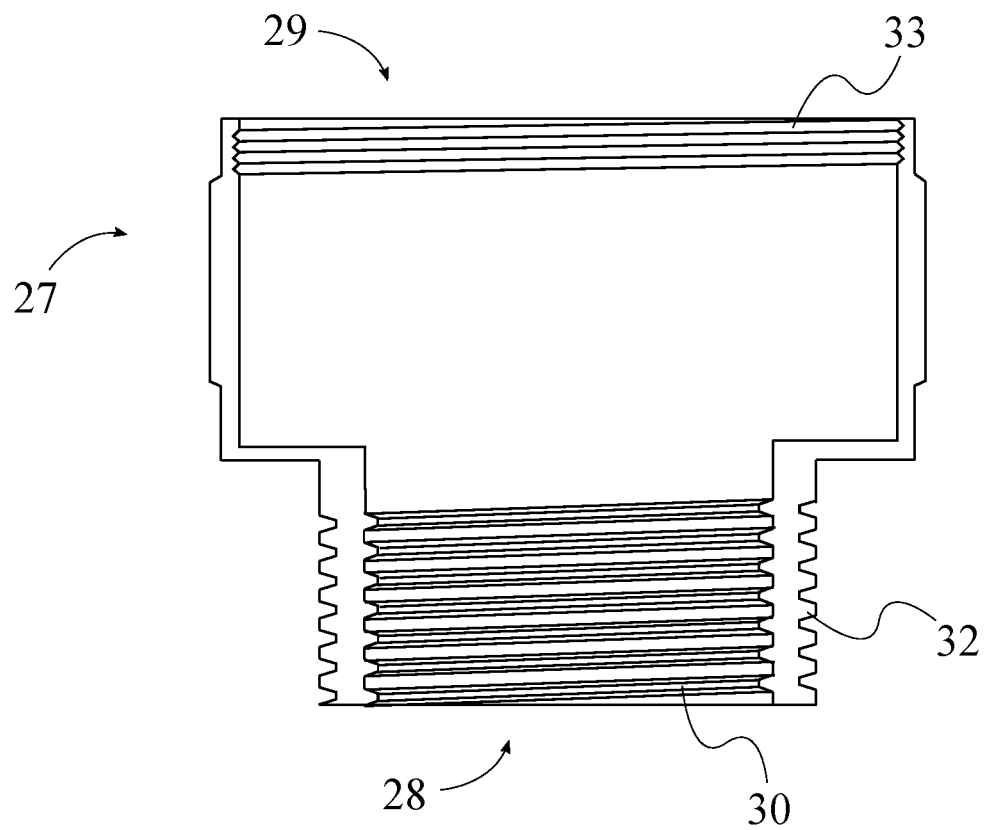
FIG. 8 is a schematic view representing an interchangeable hose connector of the present invention.

To connect the rigid sleeve 35 to the inner elastic tube 1 effectively, the user may wish to join the present invention with a threaded connector. To achieve this, the present invention may further comprise at least one interchangeable hose connector 27, as shown in FIG. 8. Such an arrangement provides a feature which is appropriately arranged relative to the tubular insert 11, the tubular brace 15, and the annular crimp 21. The at least one interchangeable hose connector 27 may comprise a connector inlet 28, a connector outlet 29, and a connector male-threading feature 32. The rigid sleeve 35 may further comprise a sleeve female-threading feature 38. The sleeve female-threading feature 38 relates to a helical channel that enables engagement with a variety of items that utilize male-threading features. The connector inlet 28 may be in fluid communication with the connector outlet 29. Furthermore, the connector inlet 28 and the connector outlet 29 may be positioned opposite to each other about the at least one interchangeable hose connector 27. This arrangement enables transfer of fluid through the at least one interchangeable hose connector 27. The connector male-threading feature 32 may be laterally connected about the connector inlet 28. This provides easy access for connection of the sleeve female-threading feature 38. The sleeve female-threading feature 38 may be positioned within the second open end 37. In this way, the sleeve female-threading feature 38 is positioned optimally for engagement with the connector male-threading feature 32. The sleeve female-threading feature 38 may be integrated into the second open end 37. Therefore, the sleeve female-threading feature 38 allows for rigid connection between the rigid sleeve 35 and the at least one interchangeable hose connector 27. Further, the sleeve female-threading feature 38 may be engaged by the connector male-threading feature 32. This arrangement secures the rigid sleeve 35 to the at least one interchangeable hose connector 27.

The user may benefit from the inclusion of components that enhance the ability of the user to apply torque necessary for joining threaded components together. To provide this need, the present invention may further comprise a plurality of sleeve gripping ridges 39, as shown in FIGS. 5 and 6. The plurality of sleeve gripping ridges 39 relates to a set of preferably linear protrusions which provide increased surface area, thereby enhancing the ability of the user to grip the present invention for the subsequent application of appropriate torque. The plurality of connector gripping ridges 31 may be laterally connected to the rigid sleeve 35. This arrangement provides the user with adequate access to the plurality of sleeve gripping ridges 39. The plurality of sleeve gripping ridges 39 may be distributed about the rigid sleeve 35. In this way, the user has enhanced ability to connect the rigid sleeve 35 to other components.

Figure 11:
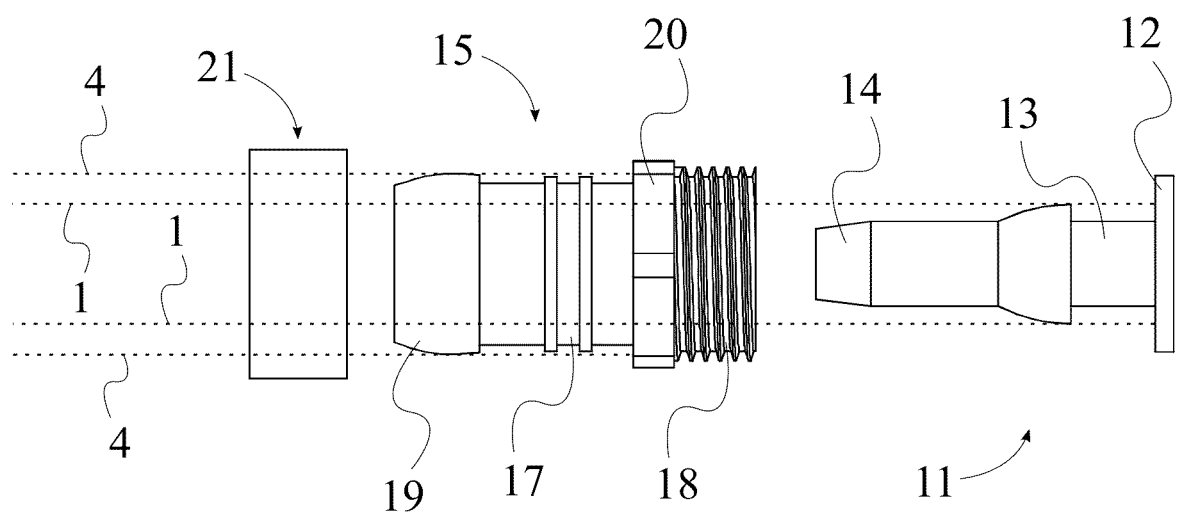
FIG. 11 is a schematic view representing an extendable hose mounted on the present invention.

The user may need to apply more torque than possible using grip strength alone in order to attach the at least one interchangeable hose connector 27 to the tubular brace 15. To provide for this need, the tubular brace 15 may further comprise a wrench-engaging feature 20, as shown in FIG. 11. The wrench-engaging feature 20 relates to a nut, screw, or a variety of other connectors or appropriately-shaped connections that allows for the utilization of a wrench or other such torque-enhancing tools with the present invention. The wrench-engaging feature 20 may be laterally integrated into the brace flange 16. This arrangement enables the user to utilize a wrench or other tool to brace the wrench-engaging feature 20 to apply torque to the tubular brace 15, thus enabling more secure connection of the tubular brace 15 to other components and attachments.

Although the invention has been explained in relation to its preferred embodiment, it is to be understood that many other possible modifications and variations can be made without departing from the spirit and scope of the invention as hereinafter claimed.

What is claimed is:
1. A self-recoiling hose system comprising:
an inner elastic tube;
a protective sheath;
a fluid inlet;
a fluid outlet;
at least one interchangeable hose connector;
the inner elastic tube comprising a first tube end and a second tube end;
the protective sheath comprising a first sheath end, a second sheath end, and a fabric body;
the fluid inlet and the fluid outlet each comprising a tubular insert, a tubular brace, and an annular crimp;
the interchangeable hose connector comprising a connector inlet, a connector outlet, and a first connector female-threading feature;
the fabric body comprising a plurality of elastic strands and a plurality of tensile strands;
the tubular insert comprising an insert flange, an insert annular groove, and an insert wedging feature;
the tubular brace comprising a brace flange, a brace annular groove, a brace male-threading feature, and a brace wedging feature;
the inner elastic tube being sleeved by the protective sheath;
the first sheath end being hermetically connected to the first tube end;
the fluid inlet being hermetically attached into the first tube end;
the second sheath end being hermetically connected around the second tube end;
the fluid outlet being hermetically attached into the second tube end;
a sheath equilibrium length of the protective sheath being greater than a tube equilibrium length of the inner elastic tube;

the plurality of elastic strands being interwoven amongst the plurality of tensile strands;
the insert flange and the insert wedging feature being positioned opposite to each other along the tubular insert;
the insert annular groove being laterally positioned around the tubular insert, adjacent to the insert flange;
the brace male-threading feature and the brace wedging feature being positioned opposite to each other along the tubular brace;
the brace flange being laterally positioned around the tubular brace, adjacent to the brace male-threading feature;
the brace annular groove being laterally positioned around the tubular brace;
the brace annular groove being positioned adjacent to the brace flange, opposite the brace male-threading feature;
the insert annular groove and the insert wedging feature being positioned inside the tubular brace;
the insert flange being positioned outside the tubular brace;
the insert flange being pressed against the brace male-threading feature;
the annular crimp being mounted around the brace annular groove;
the insert wedging feature of the fluid inlet being hermetically attached into the first tube end;
the insert wedging feature of the fluid outlet being hermetically attached into the second tube end;
the connector inlet being diametrically smaller than the connector outlet;
the connector inlet being in fluid communication with the connector outlet;
the connector inlet and the connector outlet being positioned opposite to each other about the interchangeable hose connector;
the first connector female-threading feature being positioned within the connector inlet; and
the first connector female-threading feature being integrated into the connector inlet.

2. The self-recoiling hose system as claimed in claim 1, wherein:
wherein the inner elastic tube and the protective sheath are arranged into a resting configuration; and
the protective sheath being ruched along the inner elastic tube.

3. The self-recoiling hose system as claimed in claim 1, wherein:
wherein the inner elastic tube and the protective sheath are arranged into an extended configuration; and
a sheath stretched length of the protective sheath being equal to a tube stretched length of the inner elastic tube.

4. The self-recoiling hose system as claimed in claim 1, wherein the inner elastic tube is made of a semirigid polymeric material.

5. The self-recoiling hose system as claimed in claim 1, wherein:
the interchangeable hose connector further comprising a plurality of connector gripping ridges;
the plurality of connector gripping ridges being laterally connected to the connector outlet;
the plurality of connector gripping ridges being distributed about the connector outlet; and
the plurality of connector gripping ridges being a plurality of connector splines; and
each of the plurality of connector splines being positioned parallel to a central lengthwise axis of the interchangeable hose connector.

6. The self-recoiling hose system as claimed in claim 1, wherein:
the interchangeable hose connector further comprising a connector male-threading feature; and
the connector male-threading feature being laterally connected about the connector inlet.

7. The self-recoiling hose system as claimed in claim 1, wherein:
the interchangeable hose connector further comprising a second connector female-threading feature;
the second connector female-threading feature being positioned within the connector outlet; and
the second connector female-threading feature being integrated into the connector outlet.

8. The self-recoiling hose system as claimed in claim 1, wherein:
the interchangeable hose connector further comprising a connector valve;
the connector valve being positioned in between the connector inlet and the connector outlet; and
the connector inlet being in fluid communication with the connector outlet through the connector valve.

9. The self-recoiling hose system as claimed in claim 1 further comprising:
a rigid sleeve;
the rigid sleeve comprising a first open end and a second open end;
the rigid sleeve being mounted around the tubular insert, the tubular brace, and the annular crimp;
the tubular insert, the tubular brace, and the annular crimp being positioned offset from the first open end; and
the tubular insert, the tubular brace, and the annular crimp being positioned adjacent to the second open end.

10. The self-recoiling hose system as claimed in claim 9 further comprising:
the rigid sleeve further comprising a sleeve female-threading feature;
the sleeve female-threading feature being positioned within the second open end;
the sleeve female-threading feature being integrated into the second open end; and
the sleeve female-threading feature being engaged by the connector male-threading feature.

11. The self-recoiling hose system as claimed in claim 9 further comprising:
a plurality of sleeve gripping ridges;
the plurality of sleeve gripping ridges being laterally connected to the rigid sleeve;
the plurality of sleeve gripping ridges being distributed about the rigid sleeve;
the plurality of sleeve gripping ridges being a plurality of sleeve splines; and
each of the plurality of sleeve splines being positioned parallel to a central lengthwise axis of the rigid sleeve.

12. The self-recoiling hose system as claimed in claim 1, wherein:
the tubular brace further comprising a wrench-engaging feature; and
the wrench-engaging feature being laterally integrated into the brace flange.

* * * * *